US006499172B1

(12) United States Patent
McCracken

(10) Patent No.: US 6,499,172 B1
(45) Date of Patent: Dec. 31, 2002

(54) POWER TOOL ADJUSTABLE HANDLE ASSEMBLY

(75) Inventor: Robert E. McCracken, Belcamp, MD (US)

(73) Assignee: WMH Tool Group, Inc., Palatine, IL (US)

( * ) Notice: Subject to any disclaimer, the term of this patent is extended or adjusted under 35 U.S.C. 154(b) by 0 days.

(21) Appl. No.: 09/396,630

(22) Filed: Sep. 15, 1999

(51) Int. Cl.[7] ............................ B60S 3/06; A47L 11/14; A47L 11/282

(52) U.S. Cl. ........................... 15/97.1; 15/28; 15/144.1; 403/78; 403/84

(58) Field of Search ........................ 15/28, 97.1, 144.1; 403/78, 79, 83, 84, 85, 93, 94, 96, 164

(56) References Cited

U.S. PATENT DOCUMENTS

| | | | |
|---|---|---|---|
| 183,343 A | | 3/1876 | Sweeney |
| 910,813 A | | 1/1909 | Heer |
| 1,874,232 A | | 8/1932 | Groene et al. |
| 3,058,386 A | | 10/1962 | Morrow |
| 3,348,254 A | | 10/1967 | Storm et al. |
| 3,928,947 A | | 12/1975 | Millett |
| 3,986,409 A | | 10/1976 | Tripp et al. |
| 4,186,905 A | | 2/1980 | Brudy |
| 4,188,682 A | | 2/1980 | Burglin et al. |
| 4,239,428 A | | 12/1980 | Berzina |
| 4,517,700 A | * | 5/1985 | Pinto |
| 4,643,263 A | | 2/1987 | Karden |
| 4,727,618 A | | 3/1988 | Mahoney |
| D295,253 S | | 4/1988 | Ashworth |
| 4,791,694 A | | 12/1988 | Itay et al. |
| 4,891,915 A | | 1/1990 | Yasuda |
| 4,938,642 A | | 7/1990 | Imahashi et al. |
| 4,962,617 A | | 10/1990 | Tilders et al. |
| D312,714 S | | 12/1990 | Simonelli et al. |
| 5,062,179 A | | 11/1991 | Huang |
| 5,070,576 A | | 12/1991 | Banta |
| 5,154,435 A | | 10/1992 | Chiu |
| 5,168,601 A | | 12/1992 | Liu |
| 5,231,727 A | | 8/1993 | Armbruster |
| 5,269,045 A | | 12/1993 | DeSerio et al. |
| 5,289,605 A | | 3/1994 | Armbruster |
| 5,309,594 A | | 5/1994 | Thompson |
| 5,371,919 A | | 12/1994 | Winkler |
| 5,466,183 A | | 11/1995 | Kirn et al. |
| 5,520,474 A | * | 5/1996 | Liu |
| 5,775,657 A | | 7/1998 | Hung |
| 5,806,453 A | | 9/1998 | Cook |
| 6,266,850 B1 | | 7/2001 | Williams et al. |

OTHER PUBLICATIONS

"5 Random Orbit Dustls Sander/Polisher Kit, Model 3282DVSK", on page 116 in Bosch catalog entitled *Precision Power Tools and Accessories,* date 1992.

Exploded View and Parts List for Bosch 5 Random Orbit Sander, Model No. 3283 DVS, 2 pages (1990).

* cited by examiner

*Primary Examiner*—Randall E. Chin
(74) *Attorney, Agent, or Firm*—Fitch, Even, Tabin, & Flannery

(57) ABSTRACT

An adjustable handle assembly is provided for use with a hand-held power tool, such as a polisher, to enhance control while operating on delicate surfaces of varying contours. The handle assembly includes a handle mounted to the housing of the tool in a manner that facilitates quick adjustment of the handle between various predetermined positions relative to the housing without the use of tools, turning of nuts and bolts and prolonged work stoppage. The handle assembly also includes lock members on one of the handle and the housing and lock receiving grooves on the other of the handle and housing which can cooperate with the lock members to fix the handle in one of the predetermined positions relative to the housing. For quick adjustment, the handle assembly includes a lock manually movable by a user between a locking position in which the lock members are urged into the grooves to lock the handle relative to the housing and a release position in which the lock members are free to move from the grooves, thereby allowing the handle to be adjusted relative to the housing between the predetermined positions. The handle assembly also includes a cam means located between the lock and the handle to urge the lock members into the locking position with the grooves. The cam means may include cooperating cam surfaces on the lock and the handle.

27 Claims, 5 Drawing Sheets

POWER TOOL ADJUSTABLE HANDLE ASSEMBLY

FIELD OF THE INVENTION

The present invention relates to a hand-held power tool and, more particularly, to a hand-held power tool capable of polishing operations with a readily adjustable handle assembly that permits an operator to ergonomically adjust handle positions to enhance control and coverage of the tool during operation.

BACKGROUND OF THE INVENTION

Typically, power tools, such as polishers or waxers, for use on delicate work surfaces of varying conto tours, including exterior car finishes, tend to lack a structure for effective and precise operator control and maneuverability during operation on the surface. Such power tools commonly include a motor that drives a working element, such as a polishing or waxing pad, in an orbital path for engagement with the work surface. To prevent damage to the work surface, it is important that an operator be able to precisely guide the working element over the work surface and to simultaneously control the pressure with which the working element is applied to the work surface. For instance, if the tool is used with too much pressure, such as by not being able to control and prevent the entire weight of the tool from being applied to the working element and, consequently, the work surface, the finish on the work surface can be easily damaged or even ruined. On the other hand, too little application pressure will tend to result in the surface finish not being polished properly or in an increase in operation time to accomplish the desired finish.

The vibratory response associated with polishing with the working element under orbital motion further complicates the polishing operations. It has been found that such response felt by operators using orbital motion is significantly greater than that associated with other non-orbital type tools. Thus, the structure of the power tool must take into consideration this response.

To increase efficiency, it is also desirable that an operator be able cover a relatively large area on the work surface, while at the same time maintaining control over the application pressure and path of the tool during operation. This is usually accomplished by either relocating to a different location relative to the work surface or by extending one's arms over and about the work surface. The latter technique is used most often when polishing remote areas that cannot be accessed by simply relocating, such as when polishing central areas of an automobile, e.g., central areas of the hood, roof and trunk. As mentioned above, experience, however, has taught that accuracy and precision is sacrificed when operating the tool with one's arms extended because of the increased vibrational response from orbital motion.

To enhance control and expand the reach of these tools from a single location and otherwise, it is known to provide a right angle tool with a barrel type handle that extends from the rear of the tool perpendicular to the orbital path of the working element. While the tool can be operated by gripping the barrel handle only, experience has revealed that another handle forward of the barrel handle is preferred so that the operator is able to grip the barrel handle with one hand and the other handle with the other hand. The barrel handle provides increased control over the tool's path of operation, and the forward handle aids in controlling the application pressure to the work surface. Without the forward handle, there tends to be, in many instances, an uncomfortable amount of force applied to the hand, wrist and arm gripping the barrel handle. Thus, the combination of handles provides for maximum precision control of the application pressure while allowing the barrel handle to be used to steer the tool.

One known shortcoming associated with these multiple handle arrangements, however, is the inability to maximize the utility of the barrel grip handle. While the barrel handle provides increased control and reach, operators, as mentioned above, find that it is still necessary to grip the forward handle during operations, especially on delicate work surfaces, for complete control to avoid damage. This, however, effectively limits the range of area operators can reach with the tool from a single location because they must also extend their arms to reach the forward handle.

Moreover, it is desirable that the forward handle be adjustable to maximize reach and ergonomical control on varying surface contours and orientations. Many of these forward handle however, are fixed and, therefore, cannot be adjusted to provide this reach and control. As a result, operators contort their body into uncomfortable and compromising positions to compensate for the limitation of fixed forward handles during operation and are open to an increased potential for injury. Furthermore, the work surface also is exposed to a higher potential for damage.

Some power tools include adjustable forward handles which are released for movement and tightened down for operation by way of a bolt and nut combination. The nut is loosened to free the handle for adjustment and then is tightened to lock the position. This type of adjustment system is not easily controlled by the operator and results in undue work stoppage. It is desired to have a system that can be quickly adjusted and done so without tools and/or having to manually loosen and tighten nuts and bolts.

Thus, the present invention is directed to providing an adjustable handle assembly for use with hand-held power tools that can be easily adjusted without prolonged work stoppage to allow an operator to effectively and accurately control the working element over relatively large working areas and varying surface contours in an efficient, comfortable and safe manner.

SUMMARY OF THE INVENTION

The present invention is directed to an adjustable handle assembly for use with a hand-held power tool, such as a polisher, to enhance control and coverage while operating on delicate surfaces of varying contours and orientations. The handle assembly includes a handle mounted to a housing of the tool in a manner that facilitates easy and quick adjustment of the handle between various predetermined positions relative to the housing. As a result, the operator is able to adjust the handle depending on the contour and orientation of the surface without tools or prolonged work stoppage.

The handle assembly includes lock members on one of the handle and the housing and lock receiving grooves on the other of the handle and housing which can cooperate with the lock members to fix the handle in one of the predetermined positions relative to the housing. For quick adjustment, the handle assembly includes a lock manually movable by an operator between a locking position in which the lock members are urged into the grooves to lock the handle relative to the housing and a release position in which the lock members are free to move from the grooves, thereby allowing the handle to be adjusted relative to the housing between the predetermined positions. The predetermined positions to which the handle is adjustable include at least a flat position where the handle extends substantially perpendicular to a first direction extending along a longitudinal axis through the housing and aligned with the orbital path axis and an upright position where the handle extends substantially in the first direction.

The handle assembly also includes a cam means located between the lock and the handle to urge the lock members into the locking position with the grooves. The cam means may include cooperating cam surfaces on the lock and the handle. In manually moving the lock to the locking position, the lock cam surface cams against the handle cam surface to urge the lock members into the grooves with a biasing force sufficient to lock the handle. On the other hand, in manually moving the lock to the released position, the lock cam surfaces cam against the handle cam surface in the opposite direction to remove the biasing force from the lock members to allow adjustment of the handle. The use of the cam means to lock and release the handle allows the lock members to be controlled without turning screws or bolts to hold the locked position secure. Advantageously, the lock on the handle assembly is easily controlled by the operator without tools or prolonged work stoppage.

The lock members may be urged into the grooves in a first direction with the lock in the locking position and the lock members may cam out from the grooves and move in a second direction transverse to the first direction as the handle is adjusted with the lock in the release position. The first direction may be linear and the second direction may be angular. The lock members and lock receiving grooves may also include cam surfaces which cooperate to allow the lock members to cam out of the grooves as the handle is adjusted with the lock in the release position.

The adjustable handle assembly may include a guide between the handle and the housing for defining movement of the handle relative to the housing as the handle is being adjusted between the predetermined positions. The guide may include a stop for limiting movement of the handle relative to the housing.

The handle assembly also may include an elongated retention member to attach the handle to the housing. The lock is moved along the member by the cam means when shifting between the locking and release positions.

In another form of the present invention, an orbital polisher has a housing and a motor therein for driving a polishing pad in an orbital path below the housing. The polisher further includes a rear handle extending rearwardly from the housing and a front adjustable bail handle extending from and around the housing forwardly of the rear handle to assists a user in controlling the tool with the pad in rubbing engagement with a surface to be polished.

A locking mechanism cooperates between the front bail handle and the housing for selectively locking the bail handle in one of a plurality of predetermined positions about the housing. A lock operator movable along the bail handle by a user actuates the locking mechanism to either selectively lock the bail handle in one of the plurality of predetermined positions about the housing or release the bail handle for adjustment about the housing. The bail handle attaches to two surfaces of the housing, and the control of the locking mechanism through the lock operator locks the bail handle at each surface. The lock operator enables the user to quickly adjust one handle without turning of any nuts and bolts and by prolonged work stoppage. The bail handle, however, may be adapted to lock the handle at only one of the surfaces.

The polisher also may include an arcuate guide on one of the housing and bail handle and an arcuate recess on the other of the housing and bail handle. The guide and recess cooperate to guide the bail handle through at least about 90° of movement for adjustment about the housing. The arcuate guide may extend less than about 180° and the arcuate recess may extend more than about 180° to allow the guide to move in the recess as the handle is adjusted.

The bail handle also may include an actuator receiving portion and the lock operator may include an operator lever and an actuator knob connected to the lever. The actuator knob is located in the actuator receiving portion of the bail handle and the lever projects there-from. Pivoting of the lever to rotate the actuator knob causes the knob to move along the bail handle in the actuator receiving portion to actuate the locking mechanism.

The knob and the actuator receiving portion of the bail handle also may include cooperating cam surfaces. Pivoting of the lever by the user to a lock position causes the cam surface on the knob to cam against the cam surface on the bail handle to move the knob along the bail handle in the actuator receiving portion away from the locking mechanism to urge the bail handle towards the housing for selectively locking the bail handle in one of the plurality of predetermined positions about the housing.

The locking mechanism of the polisher also may be provided with locking teeth on one of the bail handle and the housing and grooves in the other of the bail handle and the housing. The lock operator is capable of actuating the teeth to seat tightly in corresponding grooves for locking the bail handle about the housing. The locking mechanism also may include locking teeth and grooves that have cooperating cam surfaces wherein, when the lock operator actuates the locking mechanism to release the bail handle, adjustment of the bail handle causes the teeth cam surfaces to cam against the groove cam surfaces with the teeth moving out of the grooves and over adjacent grooves to another of the plurality of predetermined positions about the housing.

In an even further form of the present invention, a power tool includes a housing having a top, bottom, front and back and a longitudinal tool axis in the housing extending in a first direction through the housing top and bottom intermediate the front and back thereof. A rear handle extends out rearwardly from the back of the housing substantially perpendicularly to the first direction. A bail handle having an interior chamber extends around the front of the housing and is adjustable to at least a flat position extending substantially perpendicular to the first direction and an upright position extending substantially in the first direction. The tool further includes a bail handle lock which is at least partially located in the interior chamber and is manually operable by a user to lock the bail handle in at least the flat and upright positions about the housing.

The bail handle of the power tool may also include rear portions rotatably connected adjacent the back of the housing, side portions extending from the rear portions and a front lateral portion extending between the side portions and spaced from the rear portions. The bail handle front portion is adjustable from in front of the housing with the bail handle in the flat position to over the top of the housing with the bail handle in the upright position by rotating the handle rear portions relative to the housing.

The bail handle also may include rear portions of the bail handle having one of a plurality of teeth and grooves and the housing adjacent the back thereof having the other of the plurality of teeth and grooves. The bail handle lock causes the teeth to seat tightly in the grooves for locking of the bail handle or to release the teeth from in the grooves to allow movement of the teeth out of and over the grooves for rotating of the bail handle rear portions and adjustment of the bail handle about the housing.

The bail handle lock also may be located at one of the bail handle rear portions. When the lock is moved to a lock position, it pushes the rear portions towards the housing causing the teeth to seat tightly in the corresponding grooves, and when the lock is moved to an unlocked position, it allows movement of the teeth out of and over the grooves for adjusting the handle.

BRIEF DESCRIPTION OF THE DRAWINGS

The present invention will be described in connection with the accompanying drawings wherein.

DETAILED DESCRIPTION OF THE PREFERRED EMBODIMENT

Figure 1:
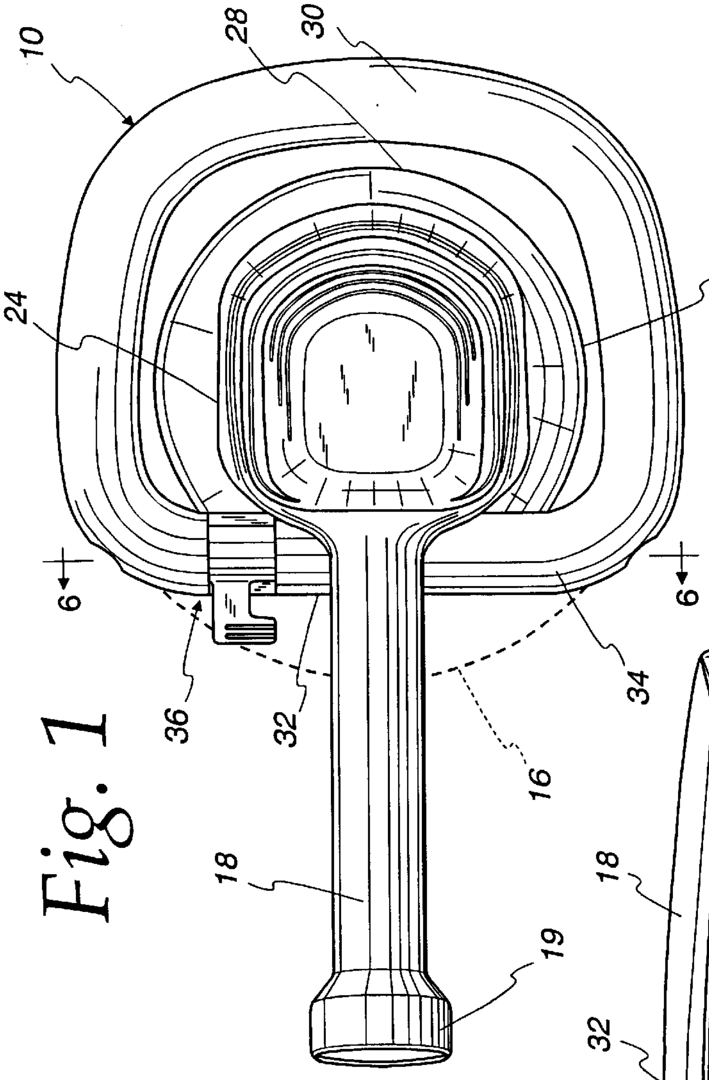
FIG. 1 is a top plan view of a hand-held power tool with an adjustable handle assembly embodying features of the present invention.
Figure 2:
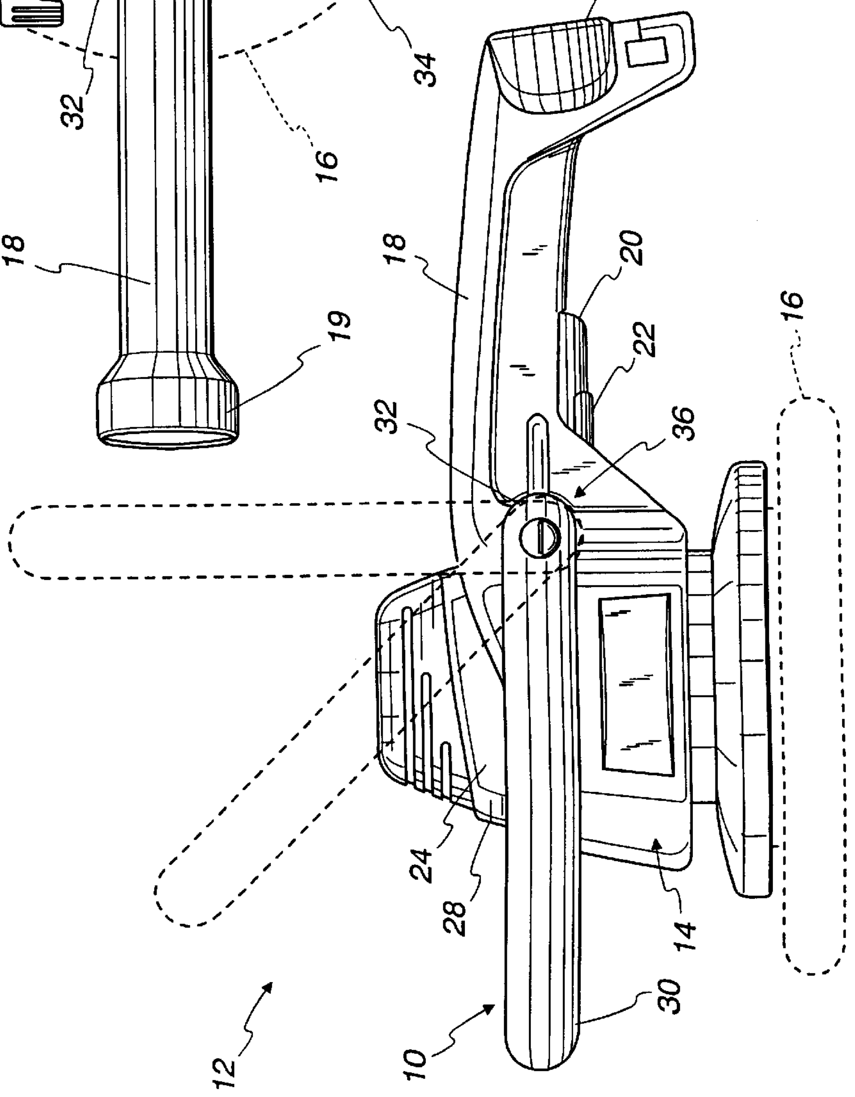
FIG. 2 is a left side elevational view of the hand-held power tool of FIG. 1 illustrating different positions of a handle of the adjustable handle assembly.
Figure 3:
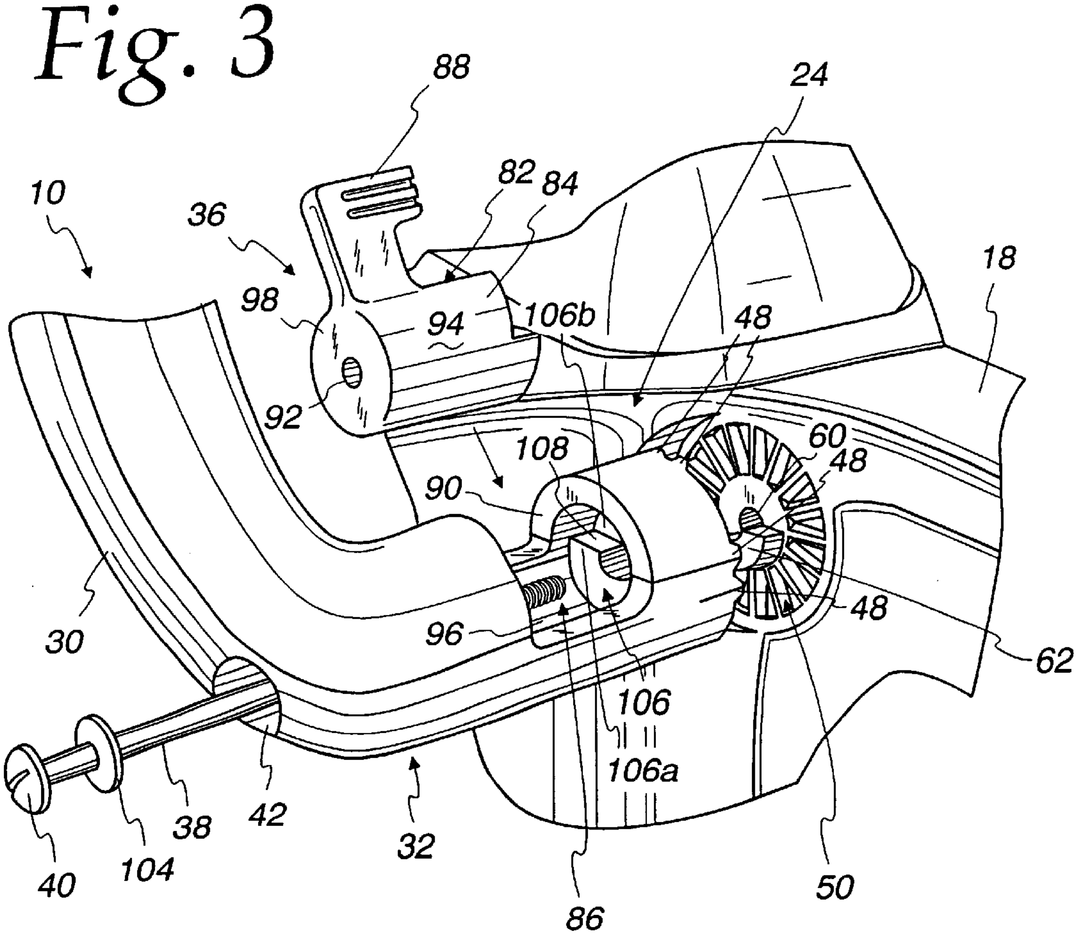
FIG. 3 is a partial, exploded perspective view of the adjustable handle assembly of FIG. 1 to illustrate features of the locking mechanism at the left side of the assembly.
Figure 4:
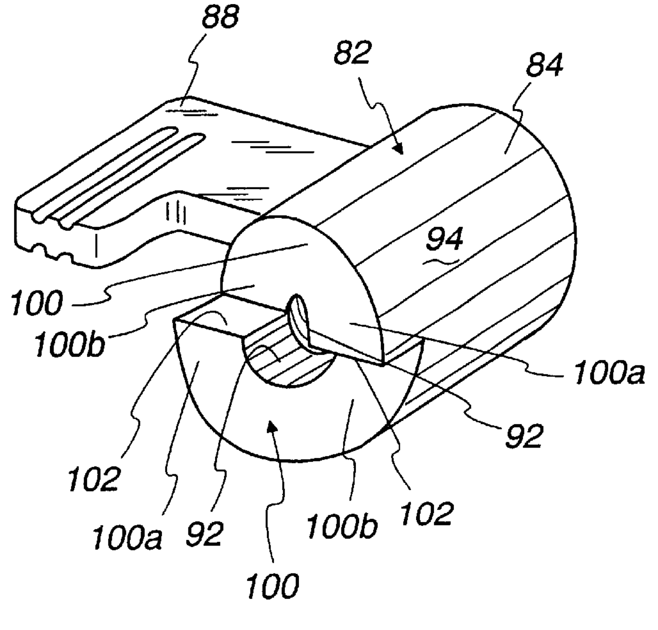
FIG. 4 is a perspective view of the locking knob of the locking mechanism at the left side of the handle assembly of FIG. 1 to illustrate the sam surfaces on the locking knob.
Figure 5:
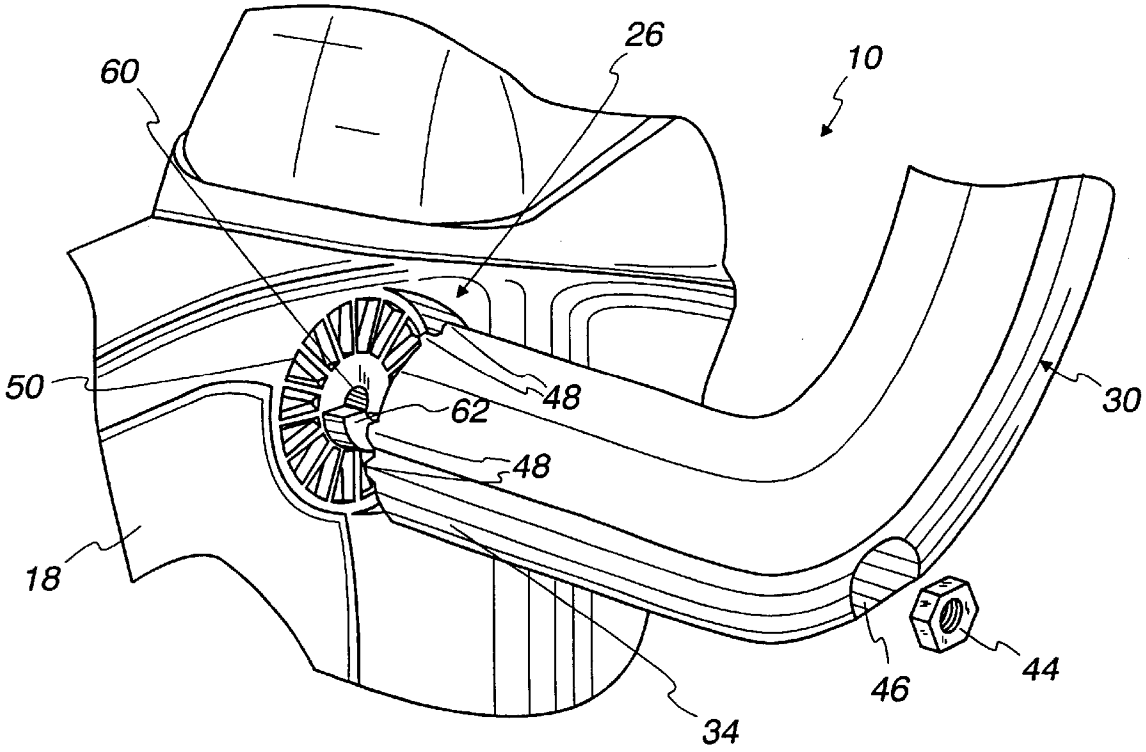
FIG. 5 is a partial, exploded perspective view of the adjustable handle assembly of FIG. 1 to illustrate features of the locking mechanism at the right side of the assembly.

Referring to FIGS. 1 and 2 of the drawings, there is illustrated a right angled, hand-held power tool 12 capable of being used in polishing operations. The tool 12 includes an adjustable handle assembly 10 embodying features of the present invention. In general, the tool 12 has a central housing 14 in which operates an electric motor capable of rotating a polishing pad 16 in an orbital path below the housing 14. A rear barrel handle 18 extends from the housing 14 perpendicularly to the orbital rotation and includes a trigger 20 to activate the motor and a trigger lock 22 to maintain the trigger 20 in the active position for extended use segments. A power cord (not shown) attaches to the rear end 19 of the barrel handle 18 to supply power to the motor in the housing 14.

During operation, the tool 12 is gripped at its rear barrel handle 18 with one hand and at a forward handle 30 of the handle assembly 10 with the other hand. To provide maximum control and an ergonomical reach over a wide range of surface contours and orientations, the handle 30 is adjustable to various orientations relative to the rear handle 18, including a level state and, as illustrated in phantom, a 45° and 90° state. The handle assembly 30 allows for this adjustment to be made quickly without tools or prolonged work stoppage.

The housing 14 includes a left side 24, right side 26 and front end 28. The handle 30 is a bail type handle with an arcuate shape extending around the housing 14 between the left housing side 24 and the right housing side 26. For instance, the handle 30 is capable of extending around the front end 28 when pivoted to the level state with the barrel handle 18. The bail handle 30 includes turned in left and right ends 32 and 34, respectively, which are pivotally connected to the housing 14 at the juncture between the barrel handle 18 and the housing 14. The handle may be of sturdy plastic material and injection molded in two pieces that are ultrasonically welded together.

The adjustable handle assembly 10 has each end 32 and 34 of the handle 30 adapted to cooperate with corresponding housing sides 24 and 26 to lock the handle 30 at both sides in the desired orientation. The assembly 10 also includes a shiftable cam activated locking mechanism 36 at the left turned in end 32 that operates to shift the handle 30 between a released state for setting the handle 30 to its desired orientation and a locked state for shifting the cooperating arrangement between the ends 32 and 34 of the handle 30 and the sides 24 and 26 of the housing 14 to lock the desired handle orientation. The adjustable handle assembly, however, may be adapted to lock the handle at one side of the housing.

Referring to FIGS. 3, 4, 6 and 7, the handle assembly 10 is mounted generally to the housing 14 with an elongated retention means in the form of a screw 38 that allows for pivotal rotation of the handle 30 in the released state. The screw 38 extends through the housing 14 to interconnect the left and right turned in ends 32 and 34 of the handle 30. The screw 38 includes an enlarged head 40 at one end that resides in an internal bore 42 formed in the left end 32 of the handle 30 adjacent the locking mechanism 36. A fastener in the form of a nut 44, preferably self-locking, is turned on threads 38*a* at the end opposite the head 40 and resides in an internal nut pocket 46 formed in the right end 34 of the handle 30. The purpose of the nut 44 is to fix the distance along the screw 38 between the head 40 and the nut 44 so that it always remains the same when shifting between the locked and released states. The cam activated locking mechanism 36 shifts the handle ends 32 and 34 between the locked and released states along the screw 38 without rotation of bolts and/or nuts. Thus, any type of shaft and end fasteners may be used as long as this distance is fixed.

Referring to FIGS. 3, 5, 8 and 9, both the left and right ends 32 and 34 of the handle 30 have four pairs of radial locking teeth 48 (FIG. 9) projecting toward the sides 24 and 26 of the housing 14. The adjacent pairs of locking teeth 48 are situated at intervals that are approximately 90° apart. The locking teeth 48 are designed to sit in radial locking grooves 50 (FIG. 8) formed in the left and right housing sides 24 and 26. The handle 30 is made such that it biases against the housing 14 with a small amount of pressure to keep the locking teeth 48 seated in the locking grooves 50 generally, but also allowing the locking teeth 48 to ratchet over the locking grooves 50 for pivoting the handle 30 to different positions in the released state. In the locked state, the teeth 48, however, are lodged into engagement with the locking grooves 50 under increased pressure from the locking mechanism 36, which keeps the locking teeth 48 from being ratcheted over the locking grooves 50, thereby securing the handle 30. The grooves 50 are spaced one after another at generally equal intervals for about 360° at the juncture between the housing 14 and the handle 30 and are complementary in shape to the teeth 48. As illustrated, there are sixteen grooves 50.

The teeth 48 are wedge shaped with a flat top 52 and ramped sides 54 and oriented to increase in width radially outward. The teeth 48 project axially toward the housing 14 with length sufficient to establish a secure bite with the grooves 50 to prevent the handle 30 from turning while in the locked state. Accordingly, the depth of each groove 50 is coordinated to match the teeth 48 length so that the top 52 and ramped sides 54 engage a flat bottom surface 56 and ramped side surfaces 58 defining each groove 50 when in the locked state.

In the released state, the locking mechanism 36 releases the pressure to allow the teeth to be able to pass by the grooves 50 to allow the handle 30 to be pivoted to another desired orientation. The ramped sides 54 and surfaces 58 of the teeth 48 and grooves 50, respectively, are designed to cam over one another to aid in spacing the teeth 48 from the grooves 50 and to otherwise free the handle ends 32 and 34 from a locked engagement with the housing 14 for pivoting. During pivoting, the teeth 48 then can ratchet over the grooves 50 under the small amount of biasing pressure provided by the handle 30.

Referring to FIGS. 6–9, the pivoting action of the handle 30 is guided at the junctures between both the left and right ends 32 and 34 and the housing 14. Through this guided action, the range for the handle 30 is limited to a preferred range of approximately 90°. More particularly, at each side 24 and 26 of the housing 14, there is a bore 60 for the screw 38 centrally located in the area defined by the radial grooves 50. The screw 38 extends through these bores 60 to extend through the housing 14. An arcuate lug 62 projects from the housing 14 about the bore 60 at each side 24 and 26 of the housing 14. Each lug 62 sits in an arcuate lug pocket 64 formed in the ends 32 and 34 of the handle 30, and extends about a handle attachment bore 66 located in the center area defined by the radial locking teeth 48. The screw 38 extends into the handle 30 at the internal bore 42 in the left end 32 and through the bore 66 and into the left side 24 of the housing 14 through bore 60. At the other side, the screw 38 extends from the right side 26 of the housing 14 through the bore 60 and into the handle 30 through the bore 66 in the right end 34 and terminates in the internal nut pocket 46.

Both the lug 62 and pocket 64 have an outer arcuate surface 68 and 70, respectively, that slide against one another during pivoting of the handle 14 and provide support at the juncture between the handle ends 32 and 34 and the left and right sides 24 and 26 of the housing 14 when the tool 12 is in use. The arcuate lengths of the lug 62 and pocket 64 are coordinated to provide the desired range of pivoting. For instance, the arcuate length of the lug 62 should extend a sufficient arcuate length to provide the desired support at the juncture, and the pocket 64 should be sufficiently longer to allow the lug 62 to move in the pocket 64 to permit the desired pivoting range for the handle 30, i.e., preferably, approximately 90°. To limit pivoting, each lug 62 includes a pair of end surfaces 72 capable of engaging corresponding end surfaces 74 in the pocket 64 to limit the rotational movement of the handle 30.

Figure 6:
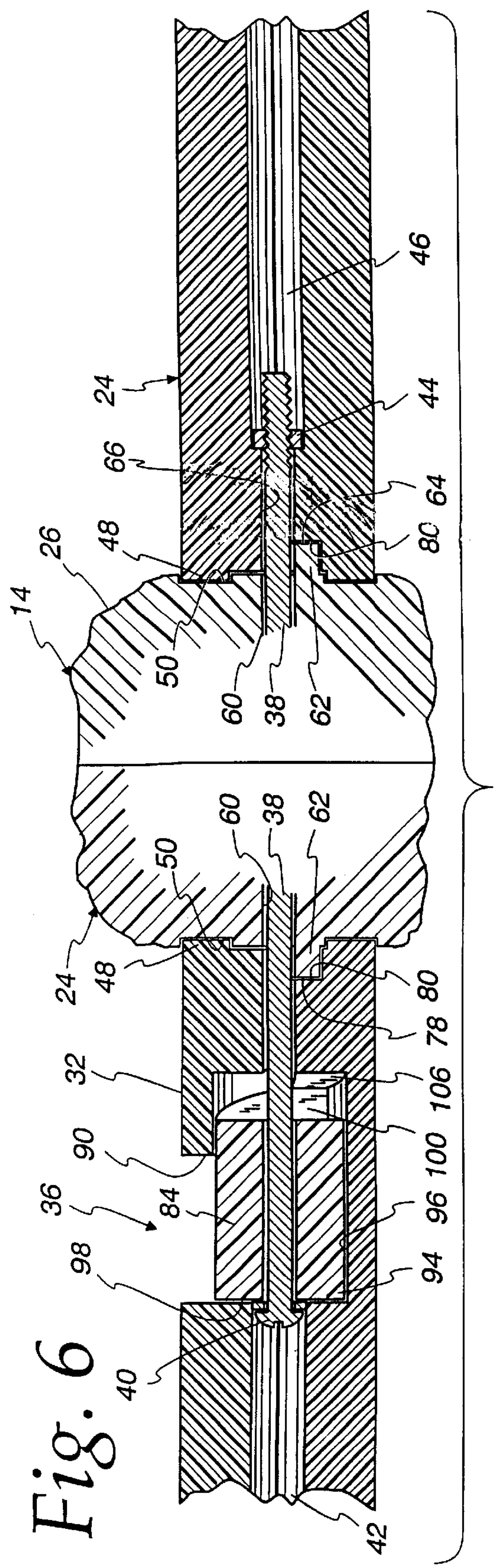
FIG. 6 is a cross-sectional view of the locking mechanism of the adjustable handle assembly taken along the line 6—6 of FIG. 1 to illustrate the locked state.
Figure 7:
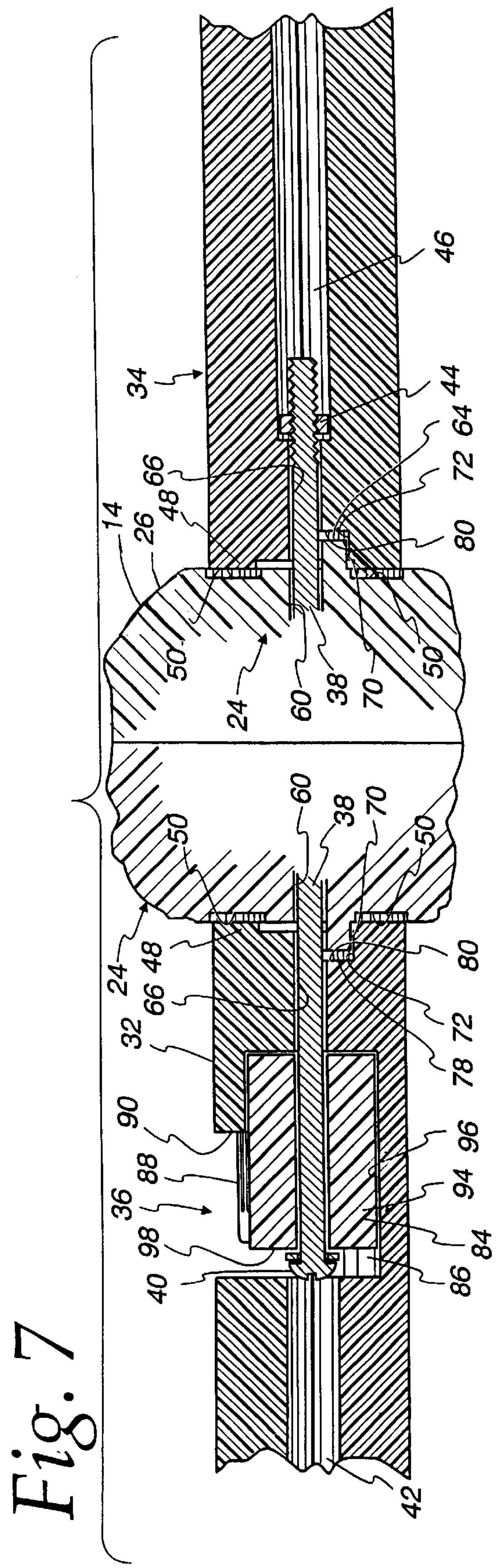
FIG. 7 is a cross-sectional view of the locking mechanism of the adjustable handle assembly taken along the line 6—6 of FIG. 1 to illustrate the released state.
Figure 8:
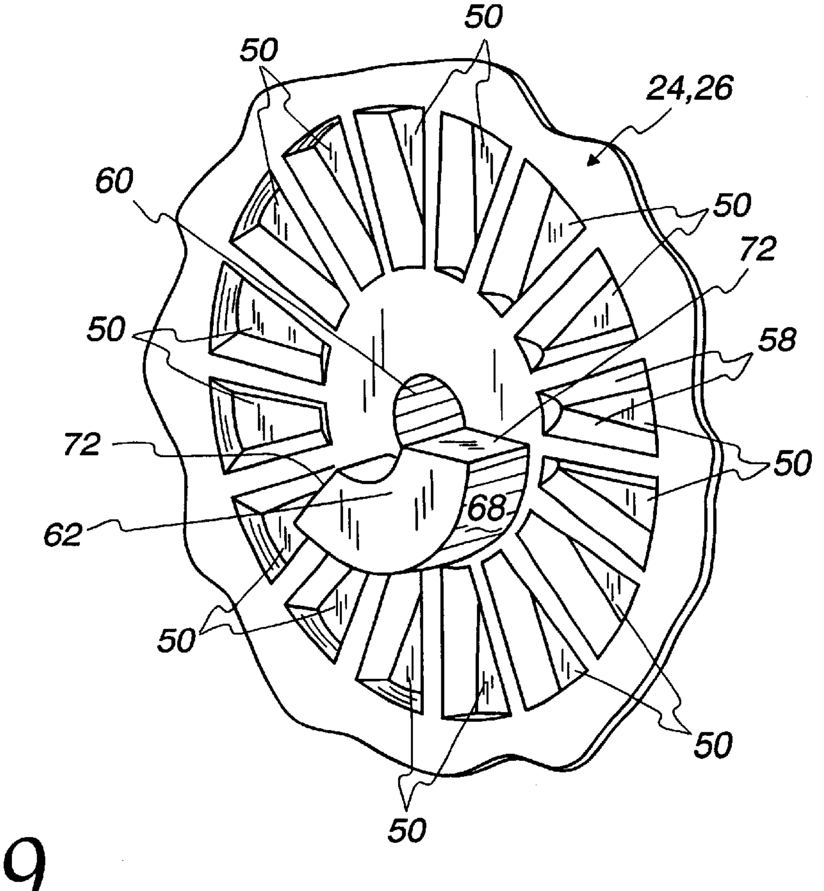
FIG. 8 is an enlarged perspective view of the locking grooves and rotational limiting lug of the locking mechanism of the adjustable handle assembly of FIG. 1.

Referring to FIGS. 6 and 7, the projection length of each lug 62 and the depth of each lug pocket 64 are greater than that of the radial locking teeth 48 and the locking grooves 50, respectively. A portion of the lug 62 remains in the lug pocket 64 to guide pivoting of the handle 30 when the locking mechanism 36 is in the released state. More particularly, the lug 62 includes a top surface 78 which is engaged with a bottom surface 80 of the pocket 64 when in the locked state (FIG. 6). In the released state, the locking teeth 48 are able to move from their locking engagement with the locking grooves 50, while the lug 62 remains in the lug pocket 64 with the top surface 78 releasing only from the bottom surface 80 and not entirely from the lug pocket 64 (FIG. 7). In this released state arrangement, the arcuate surfaces 68 and 70 of the lug 62 and lug pocket 64, respectively, guide rotation and the end surfaces 72 and 74 of the same limit rotation to the maximum range. This operation is similar at both junctures between the left and right handle ends 32 and 34 and the left and right sides 24 and 26 of the housing 14, respectively.

Referring to FIGS. 3 and 5–7, the shiftable cam activated locking mechanism 36 is located in the left end 32 of the handle 30 and shifts the handle 30 between its locked state (FIG. 6) and released state (FIG. 7). The locking mechanism 36 includes a locking knob 82 having a cylindrical shaped body 84 located in a hollow chamber 86 formed in the left end 32 of the handle 30 with a complementary shape. A lever 88 projects perpendicularly from the body 84, which is manually moved to rotate the body 84 to operate the locking mechanism 36. The lever 88 projects from the handle 30 through an arcuate slot 90 that is formed through half of the left end 32 and that extends approximately 180°. The slot 90 allows the lever 88 to be manually moved to rotate the body 84 approximately 180° in the chamber 86.

The body 84 includes a central attachment bore 92 through which passes the screw 38 and an outer arcuate surface 94 that slides over an arcuate inner surface 96 defining a portion of the chamber 86. The body 84 has a flat surface 98 at one end and a pair of arcuate ramped cam surfaces 100 at the opposite end. The cam surfaces 100 extend contiguously for approximately 180° each and are separated by a pair of radially extending steps 102.

Figure 9:
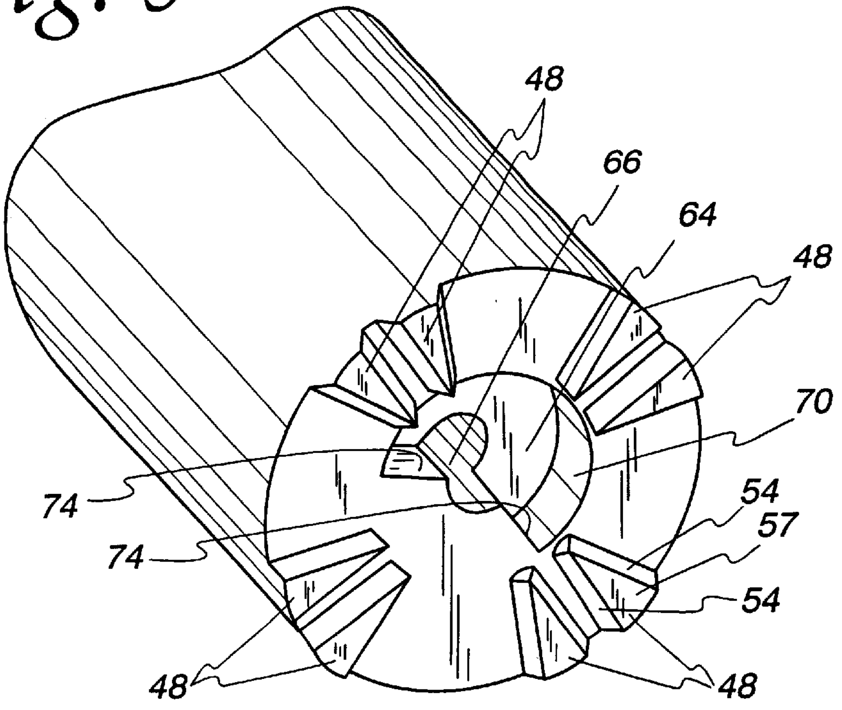
FIG. 9 is an enlarged perspective view of the locking teeth and rotation limiting lug pocket of the locking mechanism of the adjustable handle assembly of FIG. 1.

The screw 38 extends through the internal bore 42 in the left end 32 of the handle 30 so that the head 40 is in position to engage the flat surface 98 of the body 84. A washer 104 is situated on the screw 38 between the head 40 and the flat surface 98 of the body 84. With the screw 38 having a fixed length between the head 40 and washer 104 on one end and the nut 44 on the other, the body 84 is designed to shift axially in the chamber 86 to either take up play along the screw 38 to draw the left and right ends 32 and 34 into locking engagement with the left and right sides 24 and 26 of the housing 14 to set the locked state (FIG. 6) or to provide sufficient play along the screw 38 for setting the release state in which the handle 30 is free to pivot under the slight biasing pressure of the handle 30 itself with the locking teeth 48 ratcheting over the locking grooves 50 (FIG. 9).

More particularly, to shift the body 84 axially in the chamber 86, the ramped cam surfaces 100 of the body 84 cooperate with another pair of similar arcuate ramped cam surfaces 106 on the ends of the handle 30 that face toward the body 84. The cam surfaces 106 on the handle are similar to those on the body 84 and extend contiguously for approximately 180° and are separated by a pair of radially extending steps 108. The cam surfaces 100 and 106 slide against one another to shift the body 84 in the chamber 86 along the handle 30 axially away from the housing 14 when the locking knob 82 is rotated clockwise for setting the locked state (FIG. 6) and toward the housing 14 when the knob 82 is rotated counter-clockwise for setting the released state (FIG. 7).

When the knob 82 has been turned all the way clockwise, until the lever 88 abuts the slot 90, the cam surfaces 100 and

106 have slid over one another until the highest portions 100*a* and 106*a* of each are in engagement and the lower portions 100*b* and 106*b* are spaced from one another. In this position, the steps 102 and 108 also are in alignment axially. This causes the body 84 to apply outward pressure to the head 40 and washer 104 at its flat surface 98 and, at the other side, the nut 44 to tighten against the bottom of the nut pocket 46 adjacent the bore 60 for the screw 38. As a result, all of the play in the predetermined distance along the screw 38 between the head 40 and washer 104 on the one end and the nut 44 on the other has been removed and the right and left ends 32 and 34 of the handle 30 have been drawn toward the housing 14 to seat the locking teeth 48 in the locking grooves 50 under sufficient pressure lock the handle 30 for use (FIG. 6).

On the other hand, when the locking knob 82 has been turned all the way counter-clockwise, until the lever 88 abuts the opposite side of the slot 90, the cam surfaces 100 and 106 have been moved to their lowest position, in which the lower portions 100*b* and 106*b* of each surface 100 and 106, respectively, are engaged with one of the higher portion 106*a* and 100*a*, respectively, of the opposing cam surfaces. In this arrangement, the steps 102 and 108 are in engagement with one another, and the body 84 has been moved along the handle 30 toward the housing 14. This causes play to be provided along the screw 38 between its fixed ends (FIG. 7). That is, the head 40 and washer 104 are not tight against one flat surface 98 of the knob 84 and the nut 44 is not tight against the bottom of the internal nut pocket 46. This results in sufficient freedom at the left and right ends 32 and 34 of the handle 30 so that the locking teeth 48 are able to cam out of and ratchet over the locking grooves 50 for pivoting the handle 30 to a different position when in the released state.

In operation, to set the handle 30 to a different orientation, the lever 88 of the shiftable cam locking mechanism 36 is first rotated all the way counter-clockwise to set the released state, in which the body 84 has been moved along the handle 30 toward the housing 14 to provide play in the handle assembly 10 along the screw 38. This play allows the locking teeth 48 to move between the locking grooves 50 so that the handle 30 can be easily pivoted to a different desired orientation. In effect, the locking teeth 48 ratchet over the locking grooves 50 as the handle 30 is pivoted to a different position. The slight biasing force of the handle 30 causes the handle 30 to remain in the desired position until the locking mechanism 36 is shifted to the locked state.

Once in the desired position, the lever 88 is rotated all the way clockwise to set the locked state, in which the body 84 has been moved along the handle 30 away from the housing 14 to take up any play in the handle assembly 10 along the screw 38. In the locked state, the locking teeth 48 are securely lodged in the locking grooves 50, thereby preventing the handle 30 from pivoting. Thus, the whole operation of shifting the handle 30 is done without the time consuming use of tools and turning of nuts and bolts.

Each of the foregoing component parts of the present invention may be of sturdy plastic material and may be injection molded.

It will be understood that various changes in the detail, materials and arrangement of parts and assemblies which have been herein described and illustrated in order to explain the nature of the present invention may be made by those skilled in the art within the principle and scope of the present invention as expressed in the appended claims.

What is claimed is:

1. An orbital waxer power tool comprising:

a pair of handles and a housing to which the handles are attached with at least one of the handles being movable between various predetermined positions relative to the housing to allow a user to optimize hand positions for a two-handed grip with one hand on each of the handles during operation of the waxer power tool;

a motor mounted in the housing;

a pad mounted below the housing for rotation in an orbital path upon operation of the motor;

lock members associated with one of the movable handle and housing;

lock receiving grooves associated with the other of the movable handle and housing which can cooperate with the lock members to fix the movable handle in one of the predetermined positions relative to the housing;

an actuator manually movable by a user between a locking position with the lock members urged into the grooves to fix the movable handle relative to the housing and a release position for releasing the lock members from the grooves to allow the movable handle to be adjusted relative to the housing between the predetermined positions; and a cam mechanism between the actuator and the movable handle for urging the lock members into the grooves with the actuator moved to the locking position.

2. The adjustable handle assembly of claim 1 wherein the cam mechanism includes cooperating cam surfaces between the actuator and handle with manual movement of the actuator by the user between the locking and release positions causing the actuator to shift one of the cam surfaces to cam against another one of the cam surfaces to urge the lock members into the grooves with a biasing force with the actuator pivoted to the locking position and remove the biasing force from the lock members with the actuator pivoted to the release position to allow adjustment of the handle.

3. The adjustable handle assembly of claim 2 further comprising a retention member that cooperates with the cam mechanism to urge the locking teeth into the locking grooves under the biasing force with the actuator pivoted to the locking position.

4. The adjustable handle assembly of claim 3 wherein the retention member is elongated with a predetermined length.

5. The adjustable handle assembly of claim 1 wherein the lock members and lock receiving grooves include cam surfaces which cooperate to allow the lock members to cam out of the grooves as the handle is adjusted with the actuator in the release position.

6. The adjustable handle assembly of claim 1 including a guide between the handle and housing for defining movement of the handle relative to the housing as the handle is being adjusted between the predetermined positions.

7. An adjustable handle assembly for a power tool having a handle and a housing with the handle being movable between various predetermined positions relative to the housing, the adjustable handle assembly comprising:

lock members associated with one of the handle and housing;

lock receiving grooves associated with the other of the handle and housing which can cooperate with the lock members to fix the handle in one of the predetermined positions relative to the housing;

an actuator manually movable by a user between a locking position with the lock members urged into the grooves to fix the handle relative to the housing and a release position for releasing the lock members from the grooves to allow the handle to be adjusted relative to the housing between the predetermined positions; and a cam mechanism between the actuator and the handle for urging the lock members into the grooves with the actuator moved to the locking position, wherein the lock members are urged into the grooves in a first direction with the actuator in the locking position and the lock members cam out from the grooves and move in a second direction transverse to the first direction as the handle is adjusted with the actuator in the release position.

8. The adjustable handle assembly of claim 6 wherein the first direction is linear and the second direction is angular.

9. An adjustable handle assembly for a power tool having a handle and a housing with the handle being movable between various predetermined positions relative to the housing, the adjustable handle assembly comprising:

lock members associated with one of the handle and housing;

lock receiving grooves associated with the other of the handle and housing which can cooperate with the lock members to fix the handle in one of the predetermined positions relative to the housing;

an actuator manually movable by a user between a locking position with the lock members urged into the grooves to fix the handle relative to the housing and a release position for releasing the lock members from the grooves to allow the handle to be adjusted relative to the housing between the predetermined positions;

a cam mechanism between the actuator and the handle for urging the lock members into the grooves with the actuator moved to the locking position; and a guide between the handle and housing for defining movement of the handle relative to the housing as the handle is being adjusted between the predetermined positions wherein the guide includes a stop for limiting movement of the handle relative to the housing.

10. The adjustable power tool handle of claim 9, wherein the actuator is associated with the handle.

11. The adjustable power tool handle of claim 9, wherein the actuator includes a lever operator for being shifted between the locking and release positions.

12. The adjustable power tool handle of claim 9, wherein the biasing mechanism includes a portion thereof mounted to the actuator.

13. An adjustable handle assembly for a power tool having a handle and a housing with the handle being movable between various predetermined positions relative to the housing, the adjustable handle assembly comprising:

lock members associated with one of the handle and housing;

lock receiving grooves associated with the other of the handle and housing which can cooperate with the lock members to fix the handle in one of the predetermined positions relative to the housing;

an actuator manually movable by a user between a locking position with the lock members urged into the grooves to fix the handle relative to the housing and a release position for releasing the lock members from the grooves to allow the handle to be adjusted relative to the housing between the predetermined positions; and a cam mechanism between the actuator and the handle for urging the lock members into the grooves with the actuator moved to the locking position, wherein the housing includes a longitudinal axis extending in a first direction therethrough and the handle is adjustable between at least a flat position where the handle extends substantially perpendicular to the first direction and an upright position where the handle extends substantially in the first direction.

14. A polisher having a housing and a motor therein for driving a polishing pad in a path below the housing, the polisher comprising:

a front adjustable handle adjustably connected to the housing for assisting a user in controlling the polisher with the pad in rubbing engagement with a surface to be polished;

a locking mechanism cooperating between the front handle and housing for selectively locking the handle in one of a plurality of predetermined positions about the housing; and a lock operator for being shifted relative to the handle by a user to actuate the locking mechanism, the lock operator having predetermined locked and release positions so that with the lock operator shifted to the locked position the handle is substantially fixed in one of the plurality of predetermined positions about the housing and with the operator shifted to the release position the handle is released from the fixed position for adjustment between one of the plurality of predetermined positions about the housing;

an arcuate guide on one of the housing and handle and an arcuate recess on the other of the housing and handle and the guide and recess cooperating to guide the handle through at least 90° of movement for adjustment about the housing, wherein the arcuate guide extends less than about 180° and the arcuate recess extends more than about 180° to allow the guide to move in the recess as the handle is adjusted.

15. A polisher having a housing and a motor therein for driving a polishing pad in a path below the housing, the polisher comprising:

a front adjustable handle adjustably connected to the housing for assisting a user in controlling the polisher with the pad in rubbing engagement with a surface to be polished;

a locking mechanism cooperating between the front handle and housing for selectively locking the handle in one of a plurality of predetermined positions about the housing; and a lock operator for being shifted relative to the handle by a user to actuate the locking mechanism, the lock operator having predetermined locked and release positions so that with the lock operator shifted to the locked position the handle is substantially fixed in one of the plurality of predetermined positions about the housing and with the operator shifted to the release position the handle is released from the fixed position for adjustment between one of the plurality of predetermined positions about the housing, wherein the handle has an actuator receiving portion and the lock operator includes an operator lever and a shiftable portion connected to the lever with the shiftable portion in the actuator receiving portion of the handle and the lever projecting therefrom with pivoting of the lever rotating the shiftable portion in the handle and moving the shiftable portion along the handle in the actuator receiving portion to actuate the locking mechanism.

16. The polisher of claim 15 wherein the shiftable portion and the actuator receiving portion of the handle include cooperating cam surfaces with pivoting of the lever by the user to the locked position causing the cam surface on the shiftable portion to cam against the cam surface on the handle to move the shiftable portion along the handle in the actuator receiving portion away from the housing for selectively locking the handle in one of the plurality of predetermined positions about the housing.

17. A power tool comprising:

a housing having a top, bottom, front and back and a longitudinal tool axis in the housing extending in a first direction through the housing top and bottom intermediate the front and back thereof;

a rear handle extending out rearwardly from the back of the housing substantially perpendicularly to the first direction;

a bail handle having an interior chamber and having a predetermined large size for being extendable around the front of the housing and adjustable to at least a flat position extending substantially perpendicular to the first direction and an upright position extending substantially in the first direction with a portion of the bail handle disposed above the top of the housing; and a bail handle lock being at least partially located in the interior chamber and being manually operable by a user to lock the bail handle in at least the flat and upright positions about the housing.

18. The power tool of claim 17 wherein the bail handle includes connecting portions rotatably connected to the housing, and a front lateral portion extending between the connecting portions, and the bail handle front portion being adjustable from in front of the housing with the bail handle in the flat position to over the top of the housing with the bail handle in the upright position by rotating the handle connecting portions relative to the housing.

19. The power tool of claim 17 further comprising at least one retention member and wherein the bail handle includes at least one connecting portion rotatable about the retention member adjacent to the housing with the at least one connecting portion of the bail handle including one of a plurality of teeth and grooves associated therewith and the other of the plurality of teeth and grooves being associated with the housing, the retention member cooperating with the lock so that the teeth seat tightly in the grooves in response to operation of the bail handle lock for locking of the bail handle or allowing the teeth to move out of and over the grooves for rotating of the bail handle connecting portions and adjustment of the bail handle about the housing.

20. The power tool of claim 19 wherein the bail handle lock is located at one of the bail handle connecting portions and moving the lock to a lock position shifts the teeth and the grooves relative to each other so that the teeth seat tightly in the corresponding grooves and moving the lock to an unlocked position allows movement of the teeth out of and over the grooves for adjusting the handle.

21. An adjustable power tool handle for a power tool having a housing comprising:

a handle adjustably attached to the housing;

lock members associated with one of the handle and housing;

lock receiving grooves associated with the other of the handle and housing which can cooperate with the lock members to fgix the handle in one of the predetermined positions relative to the housing;

an actuator for being shifted between a locking position with the lock members urged into the grooves to fix the handle relative to the housing and a release position for releasing the lock members from the grooves to allow the handle to be adjusted relative to the housing between the predetermined positions; and a one-way biasing mechanism operable by the actuator, the biasing mechanism urging the locking members in one direction toward into the grooves with a predetermined biasing force with the actuator shifted to the locking position and with the actuator shifted to the release position the predetermined biasing force is released to allow the handle to be adjustable between the predetermined positions without the need for a separate biasing mechanism of the tool to urge the locking members away from the grooves.

22. The adjustable power tool handle of claim 21, wherein the actuator is associated with the handle.

23. The adjustable power tool handle of claim 21, wherein the actuator includes a lever operator for being shifted between the locking and release positions.

24. The adjustable power tool handle of claim 21, wherein the biasing mechanism includes a portion thereof mounted to the actuator.

25. The adjustable power tool handle of claim 21, wherein one of the lock members and grooves are shiftable relative to the other of the lock members and grooves by the shifting of the actuator.

26. The adjustable power tool handle of claim 21, including a screw member distinct from the actuator and which keeps the lock members and grooves adjacent to each other for shifting of the lock members into the groves with the actuator shifted from the release position to the locking position thereof.

27. An adjustable power tool handle for a power tool having a housing comprising:

a handle adjustably attached to the housing;

lock members associated with one of the handle and housing;

lock receiving grooves associated with the other of the handle and housing which can cooperate with the lock members to fgix the handle in one of the predetermined positions relative to the housing;

an actuator for being shifted between a locking position with the lock members urged into the grooves to fix the handle relative to the housing and a release position for releasing the lock members from the grooves to allow the handle to be adjusted relative to the housing between the predetermined positions; and a one-way biasing mechanism operable by the actuator, the biasing mechanism urging the locking members in one direction toward into the grooves with a predetermined biasing force with the actuator shifted to the locking position and with the actuator shifted to the release position the predetermined biasing force is released to allow the handle to be adjustable between the predetermined positions without the need for a separate biasing mechanism of the tool to urge the locking members away from the grooves; and a screw member distinct from the actuator and which keeps the lock members and grooves adjacent to each other for shifting of the lock members into the grooves with the actuator shifted from the released position to the locking position thereof without requiring rotation of a threaded member along the screw member.

* * * * *

UNITED STATES PATENT AND TRADEMARK OFFICE

CERTIFICATE OF CORRECTION

PATENT NO. : 6,499,172 B1 
DATED : December 31, 2002
INVENTOR(S) : Robert E. McCracken It is certified that error appears in the above-identified patent and that said Letters Patent is hereby corrected as shown below:

Column 11,
Line 15, change "6" to -- 7 --.

Column 13,
Line 63, change "fgix" to -- fix --.

Column 14,
Line 8, after "toward" insert -- and --.
Line 41, change "fgix" to -- fix --.
Line 51, after "toward" insert -- and --.

Signed and Sealed this

Twenty-second Day of April, 2003

JAMES E. ROGAN
*Director of the United States Patent and Trademark Office*